United States Patent [19]

Kob et al.

[11] 4,198,075
[45] Apr. 15, 1980

[54] SAFETY INSTALLATION IN MOTOR VEHICLES WITH A KNEE IMPACT ELEMENT

[75] Inventors: Adolf Kob, Erding; Eduard Blatner, Augsburg; Heinz Bielmeier, Ingolstadt; Wolfgang Kirchberger, Lohof; Klaus Gersmann, Münich, all of Fed. Rep. of Germany

[73] Assignee: Bayerische Motoren Werke Aktiengesellschaft, Fed. Rep. of Germany

[21] Appl. No.: 814,042

[22] Filed: Jul. 8, 1977

[30] Foreign Application Priority Data

Jul. 30, 1976 [DE] Fed. Rep. of Germany ....... 2634222

[51] Int. Cl.² ............................................. B60R 21/08
[52] U.S. Cl. ..................................... 280/753; 280/728
[58] Field of Search ............... 280/728, 729, 731, 732, 280/742, 748, 749, 751, 752, 753, 734

[56] References Cited

U.S. PATENT DOCUMENTS

| | | | |
|---|---|---|---|
| 2,855,216 | 10/1958 | Sacks | 280/753 |
| 3,262,716 | 7/1966 | Graham | 280/751 |
| 3,623,768 | 11/1971 | Capener | 280/753 X |
| 3,642,303 | 2/1972 | Irish | 280/730 |
| 3,767,229 | 10/1973 | Cain | 280/753 X |
| 3,806,154 | 4/1974 | Akiyama | 280/752 |
| 3,947,056 | 3/1976 | Schwanz | 280/730 |
| 3,984,128 | 10/1976 | Oehm | 280/751 |
| 4,062,566 | 12/1977 | Hensler | 280/751 |

FOREIGN PATENT DOCUMENTS

2248568 4/1974 Fed. Rep. of Germany .

Primary Examiner—John P. Silverstrim
Attorney, Agent, or Firm—Craig and Antonelli

[57] ABSTRACT

A motor vehicle with a safety installation for passengers, especially in passenger motor vehicles, with a knee impact element pivotally arranged at fixed vehicle parts which can be brought from a normal position into a position near the knees of the passenger by an actuating device.

40 Claims, 9 Drawing Figures

SAFETY INSTALLATION IN MOTOR VEHICLES WITH A KNEE IMPACT ELEMENT

The present invention relates to a motor vehicle with a safety installation for passengers, especially in passenger motor vehicles, with a knee impact element movably arranged at fixed vehicle parts.

Such a safety installation is disclosed in the German Offenlegungsschrift No. 22 48 568. The knee impact element is thereby displaceably arranged at the bottom side of an instrument panel by way of rectilinear guide means. In case of danger, the knee impact element is displaced out of its normal position under the instrument panel into a position very close to the knees of the passengers.

A knee impact element must give a safe retention to motor vehicle passengers of different body size and weight. For that purpose, one should aim at an impact area on the knee impact element which is of greatest possible vertical extent. Relatively narrow limits are imposed with respect thereto on the aforementioned prior art knee impact element. One of the limits is the distance of the bottom side of the instrument panel from the vehicle floor, while the other limit is drawn from the size of the leg room which enables a certain free movability of the passenger and an unimpaired ingress into and egress from the vehicle. Moreover, seats have to be coordinated in the vehicle to a knee impact element with an impact surface that is relatively narrow in the vertical direction, which seats are constructed relatively rigid within the area of their front edge. Otherwise, the possibility exists that the passenger slides with the knees underneath the knee impact element.

The present invention is concerned with the task to provide an arrangement for a knee impact element in a motor vehicle, which enables a favorable constructive adaptation of the knee impact element to the vehicle interior space without the aforementioned disadvantageous limitations from a functional point of view.

The underlying problems are solved according to the present invention by a pivotally movable arrangement of the knee impact element at fixed vehicle parts.

The possibility results from the present invention to form the knee impact element of a wall part delimiting the leg space, whence a knee impact element with an impact surface of large vertical extent is achieved in an advantageous manner.

Accordingly, it is an object of the present invention to provide a safety installation in motor vehicles with a knee impact element, which avoids by simple means the aforementioned shortcomings and drawbacks encountered in the prior art.

Another object of the present invention resides in a motor vehicle safety installation with a knee impact element which offers an impact surface of largest possible vertical extent.

A further object of the present invention resides in a knee impact element for a motor vehicle which permits a constructively favorable adaptation of the knee impact element to the interior space of the vehicle.

Still a further object of the present invention resides in a knee impact element which can be formed by a wall part delimiting the leg space of the vehicle.

A further object of the present invention resides in a safety installation for passengers of motor vehicles with a knee impact element which is simple in construction, capable of reliably fulfilling its intended safety function and easy to install into the vehicle without impairing the comfort of the driver or passenger of the vehicle.

These and further objects, features and advantages of the present invention will become more apparent from the following description when taken in connection with the accompanying drawing which shows, for purposes of illustration only, several embodiments in accordance with the present invention, and wherein.

Figure 1:
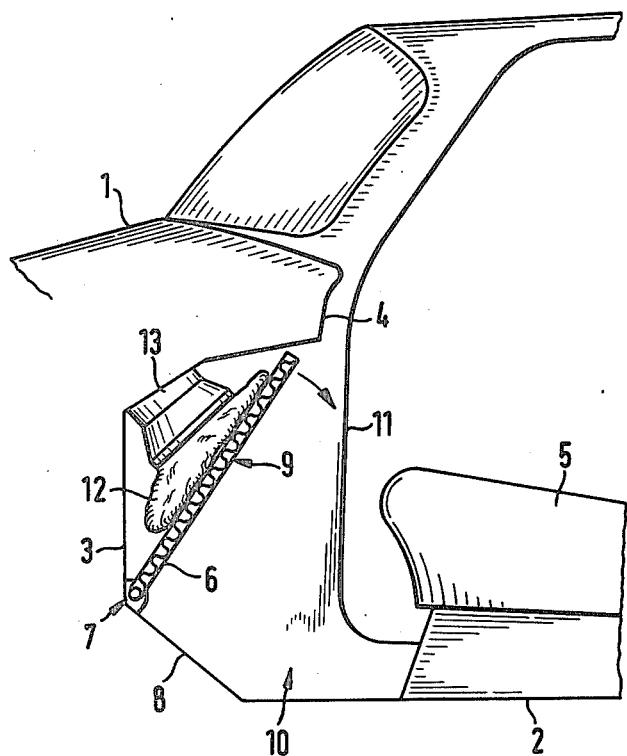
FIGS. 1 to 3 are schematic, partial side elevational views of three embodiments of a passenger motor vehicle with a knee impact plate pivotally arranged at the dashboard in accordance with the present invention and illustrating various possible supports thereof in accordance with the present invention.

Referring now to the drawing wherein like reference numerals are used throughout the various views to designate like parts, a vehicle floor 2, a dashboard or fire wall 3 as well as an instrument panel 4 are schematically illustrated in FIGS. 1 through 9 of a passenger motor vehicle not otherwise illustrated in detail. A seat 5 is arranged on the vehicle floor 2 at a distance from the dashboard 3. For purposes of securing a vehicle passenger, an installation is coordinated to the seat 5 which includes a knee impact element pivotally arranged at fixed vehicle parts.

According to FIG. 1, the knee impact element is a plate 6 constructed rigid in bending. The bending-rigid construction can be achieved, for example, by an undulated or corrugated configuration of the knee impact plate 6. The knee impact plate 6 is tiltably or pivotally arranged along its lower edge at the dashboard 3 about an axis 7 extending in the vehicle transverse direction. The pivot axis 7 extends at the dashboard 3 barely above a foot rest 8 provided on the vehicle floor 2. The knee impact plate 6 extends from the pivot axis 7 to the instrument panel 4. Consequently, the knee impact plate 6 includes an impact area 9 of large vertical extent. As a result of this construction, the knee impact plate 6 forms a large-surface forward boundary of the leg space 10 in front of the seat 5 without limiting the free movability of the passenger as well as without impairing the ingress and egress by way of the door opening 11. For purposes of actuation of the knee impact plate 6, an inflatable bag 12 is arranged on the side of the impact plate 6 opposite the passenger. The bag cooperates with an inflating device 13 of any conventional construction which is controlled by a sensor (not shown) of conventional type. The inflating installation 13 is arranged in FIG. 1 at the dashboard 3 on the side facing the knee impact element 6. The bag 12 may be dimensioned in its size so that it serves only for tilting or pivoting out the impact plate 6. However, it may also be extended by a section, as can be seen, for example, from FIG. 5, which fills out the space between the passenger and the instrument panel 4. This construction of the bag 12 is appropriate for the knee impact plate 6 coordinated to the co-driver or passenger insofar as no safety belt secures the passenger at the upper body. With a knee impact plate 6 coordinated to the vehicle driver, a bag 12 provided exclusively for tilting out the knee impact element suffices since the driver can be safeguarded by a further inflatable bag (not shown) within the area of a steering wheel.

If the passenger impinges especially with his knees against the impact plate 6, then the impact plate 6 will be supported against the inflated bag 12. For purposes of achieving an energy absorption, the bag 12 and/or the inflating installation 13 may thereby be provided with throttle places for the escape of the propellant gases present in the bag 12.

Figure 2:
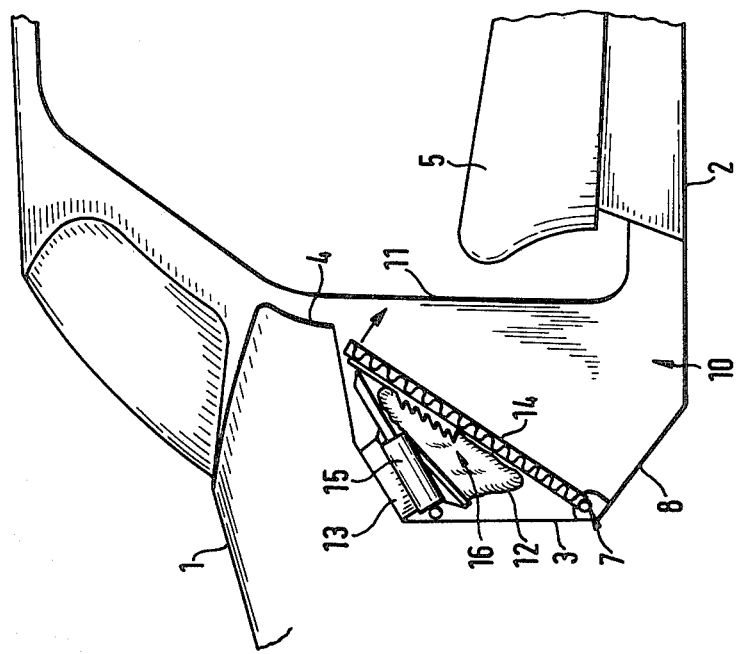

According to FIG. 2, a knee impact plate 14 may also cooperate with a known impact damper or shock-absorber 15 for purposes of achieving an energy absorption. The impact shock absorber 15 is pivotally connected, on the one hand, at the dashboard 3 and, on the other, is operatively connected with the knee impact plate 14 by way of a detent mechanism 16 of conventional construction. The detent mechanism 16 is thereby so constructed that the impact shock absorber 15 may also become effective when the knee impact plate 14 is tilted back by the impinging passenger in the direction toward the dashboard 3 already prior to reaching the maximum deflection. This may occur in case of a belated inflation of the bag 12 and also as a result of a very tall passenger seated far forwardly near the instrument panel 4. In this manner, an individually effective position of the impact plate 14 is achieved by means of the aforementioned construction, which is independent of the body size or length of the upper thighs of the passenger as well as of the passenger's seat position relative to the instrument panel 4. This advantageous effect is achieved in the embodiment according to FIG. 1 by the selection of a correspondingly large bag 12.

Figure 3:
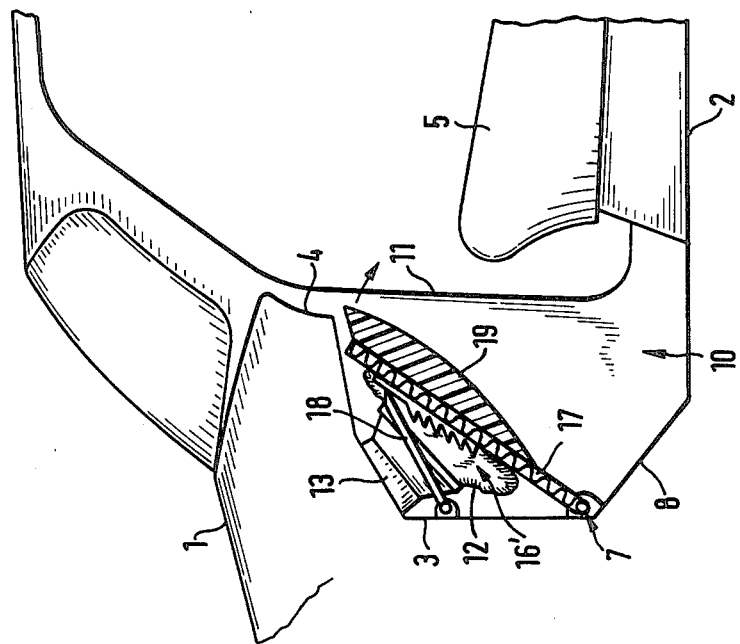

In the embodiment according to FIG. 3, a knee impact plate 17 is supported in an effective position by way of a compression rod 18 pivotally connected at the dashboard 3, which is operatively connected with the impact plate 17 by way of a detent mechanism 16'. The impact plate 17 carries an energy-absorbing padding 19 on the side facing the passenger.

Figure 4:
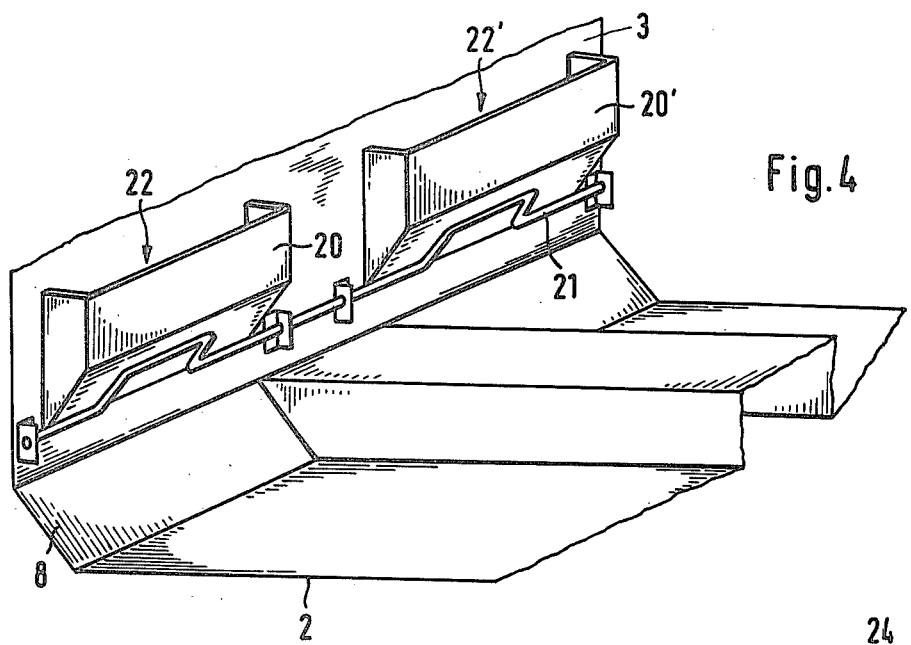
FIG. 4 is a schematic partial perspective view illustrating a modified embodiment of knee impact plates pivotally connected to the dashboard by way of a torsion rod spring in accordance with the present invention.
Figure 5:
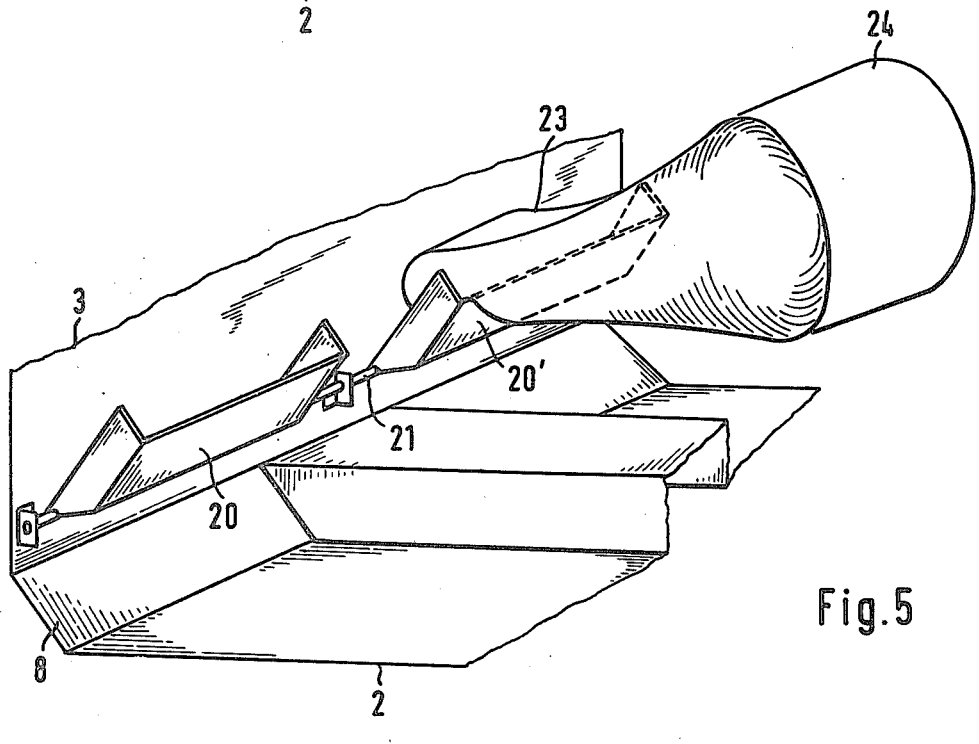
FIG. 5 is a schematic, partial perspective view of the knee impact plates according to FIG. 4 in the operating position with an air bag on the co-driver or passenger side.

In FIGS. 4 and 5, one knee impact plate 20, 20' is coordinated to the driver as also to the co-driver. The knee impact plates 20 and 20' are arranged on a common pivot shaft or torsion rod 21 which is supported or journalled at the dashboard 3. Furthermore, the knee impact plates 20 and 20' are so angularly bent in their vertical edge areas that each aforementioned knee impact element 20 and 20' encloses a space 22 and 22' with the dashboard 3. An inflatable bag serving merely for the actuation of the impact plates 20 and 20' may be arranged in each space 22 and 22'. The bag 23 (FIG. 5) acting on the knee impact element coordinated to the co-driver or passenger, for example, on the impact plate 20' may be extended according to FIG. 5 by a section 24 which in the operative position extends between passenger and instrument panel. As a result of the arrangement of the knee impact plates 20 and 20' on a common torsion rod 21 which may also be a prestressed torsion rod spring, a retention by way of the knees is assured for each passenger on one of the front seats 5 in case of a failure of one of the bags acting on the aforementioned knee impact elements. The described impact elements may also be arranged by means of a respective torsion rod spring at the backrests of front seats 4 for the retention of passengers on a rear seat-bench. Additional anchoring means retaining the knee impact plates in the normal position can be dispensed with by means of prestressed torsion rod springs.

Figure 6:
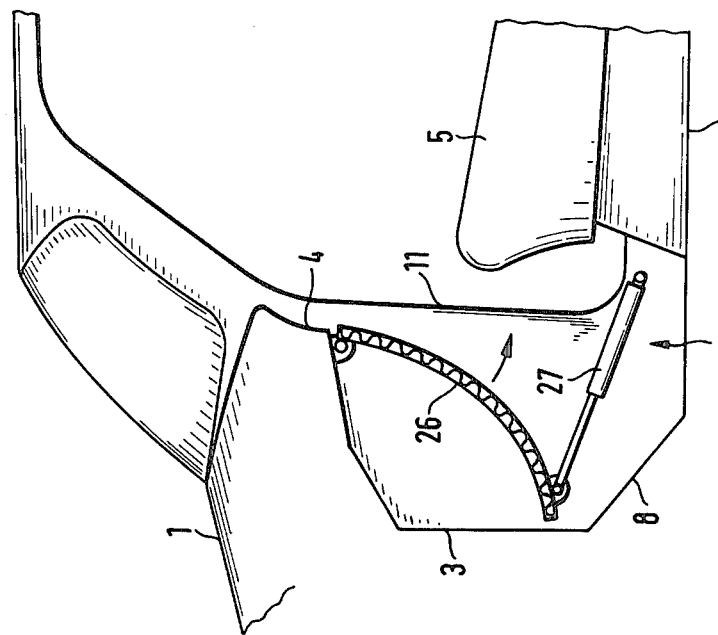
FIG. 6 is a schematic, partial side elevational view of a passenger motor vehicle with a still further modified embodiment of a knee impact plate in accordance with the present invention which is pivotally connected at the dashboard and adjoins the instrument panel in the downward direction.

FIG. 6 illustrates a knee impact plate 25 pivotally or tiltably arranged at the dashboard 3, which in the normal position uninterruptedly covers off the area underneath the instrument panel 4.

Figure 7:
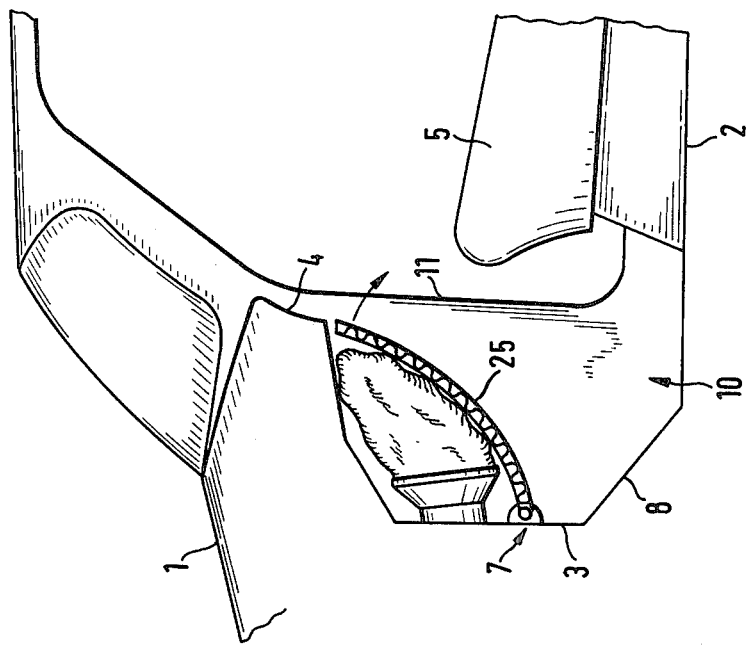
FIGS. 7 and 8 are schematic, partial side elevational views of a passenger motor vehicle illustrating two further modified embodiments of a knee impact plate pivotally arranged within the area of the instrument panel.
Figure 9:
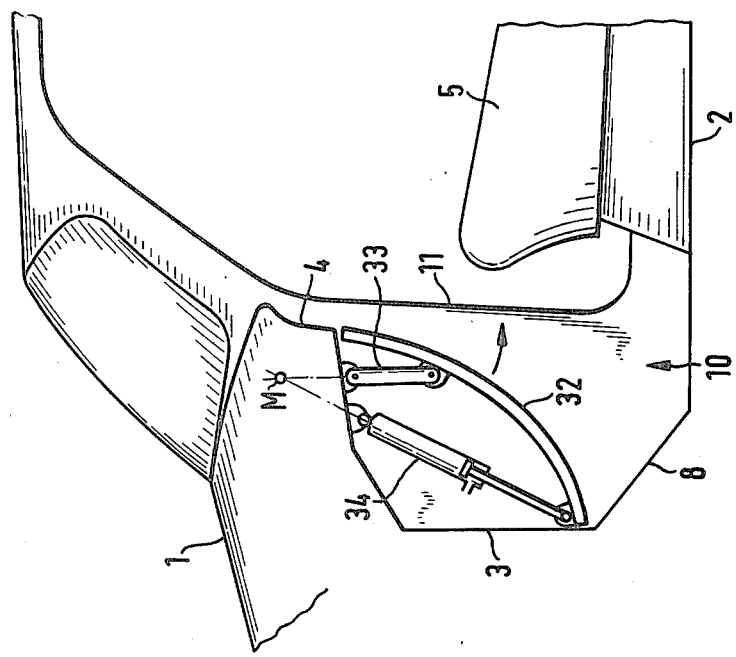
FIG. 9 is a schematic, partial side elevational view of a passenger motor vehicle with a knee impact plate pivotal about an ideal axis by means of guide members.

A knee impact plate 26 can be seen in FIG. 7 which is pivotally or tiltably arranged at the instrument panel 4 along its upper edge. A conventional belt tightener 27 engaging at the lower edge of the impact plate may be provided for the actuation of the impact plate 26. Furthermore, for purposes of achieving an energy absorption, the belt tightener 27 may include a conventional integrated mechanism for the force limitation.

Figure 8:
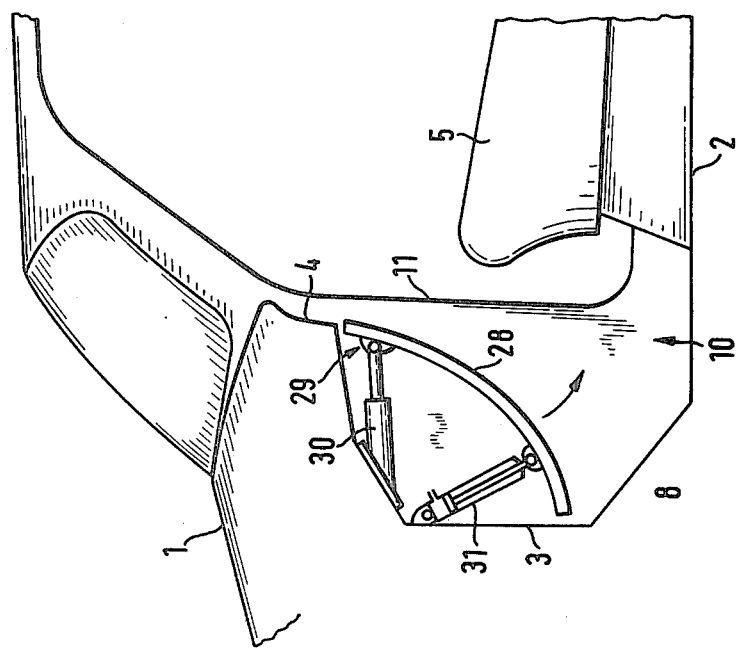

A further example for a pivotal connection of the knee impact element within the area of the instrument panel 4 is shown in FIG. 8. In this embodiment, the pivotal connection of an impact plate 28 takes place at 29 along the free end of energy-absorbing impact shock-absorbers 30. Preferably, the impact shock-absorbers 30 are immovably arranged at the dashboard 3. The knee impact plate 28 can be actuated by way of a conventional belt tightener or by any other piston/cylinder unit 31.

Finally, a knee impact plate 32 may also be pivotally arranged at fixed vehicle parts underneath the instrument panel 4 by way of guide members 33 and 34. With the knee impact plate 32 pivotal about an ideal axis M, FIG. 9, the guide member 34 may be constituted by a conventional belt tightener or in case of a pair of guide members 34, by conventional belt tighteners. The guide members 33 are preferably constructed energy-absorbing.

In order to lessen the pressure waves which result during the actuation of a knee impact plate by an inflatable bag, in their effect within the vehicle interior space, apertures or channels are arranged preferably in the dashboard which lead to a space disposed in front of the dashboard within the vehicle front section.

While we have shown and described several embodiments in accordance with the present invention, it is understood that the same is not limited thereto but is susceptible of numerous changes and modifications as known to those skilled in the art. For example, the present invention is not limited in its construction to a plate as knee impact element to be integrated preferably in the interior space of the vehicle. Consequently, we do not wish to be limited to the details shown and described herein but intend to cover all such changes and modifications as are encompassed by the scope of the appended claims.

We claim:

1. In a motor vehicle with a body forming a passenger compartment and comprising a vehicle floor, a dashboard adjoining said floor and an instrument panel, at least one passenger seat being arranged within said passenger compartment and mounted on the vehicle floor at a distance from the dashboard, the improvement comprising a safety installation for a passenger coordinated to the seat and including a movably arranged knee impact means pivotally mounted to a fixed part of said body and a device for pivoting the knee impact means from a normal position into a position near the knees of the passenger in response to a collision, said knee impact means including a bending-rigid plate which extends from the bottom side of the instrument panel essentially to the vehicle floor.

2. A motor vehicle according to claim 1, characterized in that the actuating device is an inflatable bag means.

3. A motor vehicle according to claim 1, characterized in that said knee impact means is pivotally mounted about an axis extending substantially in the vehicle transverse direction.

4. A motor vehicle according to claim 3, characterized in that said axis is along the lower edge of said knee impact means and in that said device includes an inflatable bag means provided for the actuation of the knee impact means on the side of said knee impact means opposite the passenger seat.

5. A motor vehicle according to claim 4, characterized in that the knee impact means upon achieving an effective position is operatively connected with shock absorbers as energy-absorbing means.

6. A motor vehicle according to claim 4, characterized in that the knee impact means is operatively connected with a tilt-back locking means and includes an energy-absorbing padding.

7. A motor vehicle according to claim 6, characterized in that the knee impact means covers the area underneath the instrument panel in the rest position at least sectionwise.

8. A motor vehicle according to claim 7, characterized in that the knee impact means covers the area underneath the instrument panel uninterruptedly.

9. A motor vehicle according to claim 4, characterized in that the knee impact means is angularly bent off in vertical edge areas and together with said dashboard delimits a space.

10. A motor vehicle according to claim 9, characterized in that said inflatable bag means for the actuation of the knee impact means is arranged in said space.

11. A motor vehicle according to claim 10, characterized in that the knee impact means upon achieving an effective position is operatively connected with shock-absorbers as energy-absorbing means.

12. A motor vehicle according to claim 10, characterized in that an inflating means for the inflatable bag means is also arranged within said space.

13. A motor vehicle according to claim 10, characterized in that the knee impact means is operatively connected with a tilt-back locking means and includes an energy-absorbing padding.

14. A motor vehicle according to claim 10, characterized in that the knee impact means is mounted at said fixed vehicle part by way of a torsion rod spring means.

15. A motor vehicle according to claim 14, characterized in that said torsion rod spring means is prestressed.

16. A motor vehicle according to claim 9, characterized in that one knee impact means is arranged on the driver side and one on the co-driver side plate, both knee impact plate means being operatively connected with each other by way of a common torsion rod.

17. A motor vehicle according to claim 16, characterized in that said inflatable bag means is coordinated to the knee impact means on the co-driver side which is extended by a section that in the operative position fills the space between the co-driver and the instrument panel.

18. A motor vehicle according to claim 3, characterized in that said axis is along the upper edge of said knee impact means, said knee impact means being operatively connected along its lower edge area to said device.

19. A motor vehicle according to claim 18, characterized in that the knee impact means is pivotally mounted along its upper edge at the instrument panel.

20. A motor vehicle according to claim 19, characterized in that said device is a belt tightener.

21. A motor vehicle according to claim 20, characterized in that the knee impact means is pivotally connected at the free ends of energy-absorbing impact shock-absorber means arranged fixedly at said fixed part.

22. A motor vehicle according to claim 3, characterized in that the knee impact means is arranged for pivotal movement by way of guide means.

23. A motor vehicle according to claim 22, characterized in that said guide means include at least one belt-tightener and at least one energy-absorbing means.

24. A motor vehicle according to claim 1, characterized in that the knee impact means is pivotally mounted along its lower edge at said fixed part and in that an inflatable bag means is provided for the actuation of the knee impact means on the side opposite the passenger.

25. A motor vehicle according to claim 1, characterized in that the knee impact means upon achieving an effective position is operatively connected with shock absorbers as energy-absorbing means.

26. A motor vehicle according to claim 1, characterized in that the knee impact means is operatively connected with a tilt-back locking means and includes an energy-absorbing padding.

27. A motor vehicle according to claim 1, characterized in that the knee impact means is angularly bent off in vertical edge areas and together with said dashboard delimits a space.

28. A motor vehicle according to claim 27, characterized in that said device includes an inflatable air bag means for the actuation of the knee impact means is arranged in said space.

29. A motor vehicle according to claim 1, characterized in that the knee impact means is arranged at fixed said part by way of a torsion rod spring means.

30. A motor vehicle according to claim 1, characterized in that one knee impact means each is arranged on the driver side and on the co-driver side, both knee impact means being operatively connected with each other by way of a common torsion rod.

31. A motor vehicle according to claim 30, characterized in that an inflatable bag means is coordinated to the knee impact means on the co-driver side which is extended by a section that in the operative position fills the space between the co-driver and the instrument panel.

32. A motor vehicle according to claim 1, characterized in that the knee impact means covers the area underneath the instrument panel at least sectionwise.

33. A motor vehicle according to claim 32, characterized in that the knee impact means covers the area underneath the instrument panel uninterruptedly.

34. A motor vehicle according to claim 1, characterized in that the knee impact means is pivotally mounted along its upper edge at said fixed part and is operatively connected along its lower edge area with said device.

35. A motor vehicle according to claim 34, characterized in that the knee impact means is pivotally mounted along its upper edge at the instrument panel.

36. A motor vehicle according to claim 34, characterized in that said device is a belt tightener.

37. A motor vehicle according to claim 1, characterized in that the knee impact means is pivotally connected at the free ends of energy-absorbing impact shock-absorber means arranged fixedly at the vehicle.

38. A motor vehicle according to claim 1, characterized in that the knee impact means is arranged for pivotal movement by way of guide means.

39. A motor vehicle according to claim 38, characterized in that said guide means include at least one belt-tightener and at least one energy-absorbing means.

40. A motor vehicle according to claim 1, characterized in that said device is actuable by a pressurized medium and arranged in a space delimited by the knee impact plate means, the dashboard and the instrument panel.

* * * * *